US010661405B2

(12) United States Patent
Perez Perlado et al.

(10) Patent No.: US 10,661,405 B2
(45) Date of Patent: May 26, 2020

(54) MACHINE TOOL WITH ACTIVE DAMPING

(71) Applicant: SORALUCE, S.COOP., Bergara (Guipuzcoa) (ES)

(72) Inventors: Jon Perez Perlado, Bergara (ES); Iker Mancisidor Aizpurua, Elgoibar (ES)

(73) Assignee: SORALUCE, S.COOP., Bergara (Guipuzcoa) (ES)

( * ) Notice: Subject to any disclaimer, the term of this patent is extended or adjusted under 35 U.S.C. 154(b) by 0 days.

(21) Appl. No.: 16/353,596

(22) Filed: Mar. 14, 2019

(65) Prior Publication Data
US 2019/0299349 A1 Oct. 3, 2019

(30) Foreign Application Priority Data

Jan. 15, 2018 (ES) .................... 201830040

(51) Int. Cl.
B23Q 11/00 (2006.01)
B23Q 1/50 (2006.01)
B23Q 1/01 (2006.01)

(52) U.S. Cl.
CPC .......... *B23Q 11/0035* (2013.01); *B23Q 1/01* (2013.01); *B23Q 1/50* (2013.01); *B23Q 11/0039* (2013.01); *B23Q 2220/006* (2013.01)

(58) Field of Classification Search
CPC ........ B23Q 11/0035; B23Q 1/01; B23Q 1/50; B23Q 11/0039; B23Q 15/02; B23Q 15/12
See application file for complete search history.

(56) References Cited

U.S. PATENT DOCUMENTS 2,960,189 A * 11/1960 Osburn .............. B23Q 17/0976
188/381
3,230,831 A * 1/1966 Harker ............... B23Q 17/0976
409/141
5,170,103 A 12/1992 Rouch et al.
6,719,503 B1 * 4/2004 McCalmont ....... B23Q 11/0035
188/378
7,690,872 B2 * 4/2010 Hashimoto ........ B23Q 11/0035
409/141
2010/0310334 A1 12/2010 Inoue et al.

FOREIGN PATENT DOCUMENTS

EP 3017911 A1 5/2016
EP 3078452 A1 10/2016
ES 2425994 A1 10/2013

OTHER PUBLICATIONS

Search Report for Corresponding Spanish Application No. 201830040 (1 Page) (dated Sep. 7, 2018).

* cited by examiner

Primary Examiner — Thomas C Diaz
(74) Attorney, Agent, or Firm — Lucas & Mercanti, LLP

(57) ABSTRACT

A machine tool with active damping is provided, having a ram with longitudinal walls wherein vibrations are produced during machining according to at least a main bending direction (D1, D2) of the ram, a head that is arranged at one free end of the ram, actuation means for actuating the head which are arranged on one of the longitudinal walls of the ram, and damping means configured to generate at least a force (F1, F2) in the main bending direction (D1, D2) of the ram, wherein the damping means are arranged in a partial cross section of the longitudinal wall of the ram wherein the actuation means are arranged, the partial cross section being located between the actuation means and the free end of the ram on which the head is arranged.

6 Claims, 3 Drawing Sheets

MACHINE TOOL WITH ACTIVE DAMPING

CROSS REFERENCE TO RELATED APPLICATION

This application claims the benefit of priority of Spanish Patent Application No. P201830040, filed Jan. 15, 2018, the contents of which is incorporated herein by reference.

TECHNICAL FIELD

The present invention is related to suppression, or attenuation, of vibrations produced during machining processes in machine tools, such as milling machines or boring machines which incorporate a cantilevered moving element that holds a working tool (RAM). The invention proposes a machine tool with an active inertial damping system that is provided on the ram in the proximity of the cutting point occupying a minimum space and without hindering the machining operations of the machine.

STATE OF THE ART

In recent years the sector of machine tools has evolved towards solutions that allow for greater productivity, improving the quality of pieces produced and reducing costs. In this sense, attenuation or suppression of self-regenerative vibrations or chatter during machining is ever so important.

The mechanical structures of machine tools vibrate during machining operations, and self-regenerative vibrations can appear, which due to their nature can be harmful to the surface quality of the final piece and to the integrity of the components of the machine itself, and furthermore, they can cause premature wear on the cutting tool or even cause it to break.

Machine tools equipped with cantilevered moving elements, such as milling machines or boring machines that incorporate a RAM, have a dynamic response that depends on the working position. The mass distribution, as well as the flexibility measured on the point of the tool, varies based on the position of the moving elements that make up the structure of the machine. With the ram being the most flexible element, the position thereof largely determines the behaviour of the machine. This being so, when the tool interacts with the piece during the cutting process, the machine can behave in a very different way depending on the position of the ram, with strong vibrations able to be produced in the cutting capacity of the machine.

The dynamic response to any mechanical structure depends on the mass distribution, the rigidity of the vibration types, and the intrinsic damping for each one of these types, the increase in the damping being especially efficient for improving the dynamic rigidity.

Different methods are known which allow damping to be added to a mechanical structure, and among these methods we find both the use of passive dampers and active dampers.

Passive dampers consist of a suspended mass attached to the structure to be damped by means of a damped flexible attachment. The natural frequency of the passive damper is fine-tuned so that it coincides with the natural frequency of the structure to be damped. However, these passive dampers become less effective when the dynamic parameters of the structure to be damped vary. They are not very effective for the case of machines having variable dynamics, since they require different fine-tuning depending on the working position. Furthermore, in order to achieve certain effectiveness, the mass of the system is usually large, and as a result the volume of the damper is also large, making the integration thereof in the machine very difficult.

Active dampers are able to overcome this problem thanks to their ability to adapt to dynamically changing environments. These dampers are made up of sensors which measure the vibration produced and actuators that allow a force that is opposite to the vibration to be introduced, thereby generating the damping effect. In the case of active inertial dampers, this force is obtained by accelerating a moving mass that is suspended in the structure to be damped, such that when the moving mass is accelerated in the required direction, an inertial force reducing the vibration amplitude in the machine tool is generated. For example, an article by Cowley and Boyle published in 1970 discloses the use of a system for measuring vibration by means of an accelerometer and generating a set point which is introduced in an inertial actuator producing the damping effect on the structure of a machine tool. "*Cowley, A.; Boyle, A.; Active dampers for machine tools; Annals of the CIRP, vol. 18, pp. 213-222, 1970*".

Although active dampers are a suitable solution for damping the vibrations in machines that have cantilevered moving elements, such as a ram, the problem lies in the integration of the damping system in the machine. It is known that the damping system must be as close as possible to the cutting point in order to be effective, in other words, it must be as close as possible to the head which houses the machine tool. However, there are many space restrictions in this area of the machine.

One solution that integrates a damping system in the machine is described in document ES2425994B1, which discloses a machine tool that incorporates an inertial actuator in the cutting head. Although this solution allows the dynamic working behaviour of machine to be improved, since the damping of the vibrations is done very close to the cutting point where the origin of the vibrations is, given that the cutting head is a moving part that rotates with respect to the ram, the passage of the power and control signals that are necessary for the inertial actuator is complicated and expensive.

Document EP3017911B1 discloses a machine tool with a cantilevered moving element (ram) incorporating two one-way inertial actuators. The inertial actuators are located at the end of the ram which is located closest to the cutting tool on two contiguous side faces of the ram. Each inertial actuator is particularly adapted for generating a force parallel to the surface of the side face of the ram on which it is arranged, the two forces generated by both actuators being orthogonal to one another. This solution does not require complicated systems to carry the power and control signals to the head, since the dampers are integrated in the ram, and furthermore, the dampers do not protrude outside of the ram, and therefore no interference is produced between the ram and the piece during machining, nor is the path of the ram limited in the exit thereof with respect to the machine.

The solution described in document EP3017911B1 is designed for machines with a relatively large size which, in spite of the restrictions of space, allow several elements to be arranged on the inside of the ram, for example the actuation system of the head, cooling hoses, or power cables and signal cables, the dampers being integrated on the side faces of the ram so that they do not come into contact with the elements on the inside of the ram. However, machine tools exist that are smaller in size, wherein the restrictions of space are even greater, such that even the actuation system of the head must be situated outside of the ram, and thus in these types of smaller machines it is highly complicated to integrate suitable actuators inside the ram for the function of damping, even if the side faces of the ram are used.

It is therefore necessary to provide a solution that allows an active damping system to be incorporated in these smaller types of machines which occupies the least amount of space possible so that it does not interfere in the machining operations and which is situated as close as possible to the cutting point so as to improve the effectiveness thereof.

OBJECT OF THE INVENTION

According to the invention, a machine tool is proposed that is equipped with a ram, for example a milling machine or a boring machine, and which has an active inertial damping system integrated in the machine in the vicinity of the cutting point.

The machine tool of the invention comprises:

a ram wherein vibrations are produced during the machining according to at least a main bending direction of the ram, the ram having longitudinal walls, a head that is arranged on a free end of the ram, actuation means for actuating the head that are arranged on one of the longitudinal walls of the ram, and damping means configured to generate at least a force in the main bending direction of the ram.

According to the invention, the damping means are arranged on a partial cross section of the longitudinal wall of the ram wherein the actuation means of the head are arranged, the partial cross section of the longitudinal wall being located between the actuation means and the free end of the ram in which the head is arranged.

With this solution the damping means are arranged on a single longitudinal wall of the ram, making use of a free space located next to the actuation means in the vicinity of the cutting point, and remaining on the interior of a casing that covers the actuation means. This way the damping effect is optimised, given the closeness of the damping means to the cutting point, and, furthermore, with this arrangement of the damping means, possible interferences that may be produced between the ram and the piece to be machined are largely prevented and the path of the ram in the exit thereof with respect to the machine is not limited.

Preferably the damping means are configured to generate two forces in two main bending directions of the ram.

Even more preferably, the damping means are two one-way active dampers, each one configured to generate one of the two forces in one of the two main bending directions of the ram.

The one-way active dampers have a flat rectangular form with four small faces and two large faces wherein the dampers are supported and are facing one another by the large faces thereof, the forces generated by the dampers being parallel to the large faces thereof and perpendicular with respect to one another. This way, the arrangement of the dampers and the space occupied by the same are optimised.

Thus, an easy and efficient solution is obtained for providing an active damping system for a machine tool that has a ram which due to the size restrictions thereof does not allow for the integration of the damping system inside the ram itself.

DETAILED DESCRIPTION OF THE INVENTION

Figure 1:
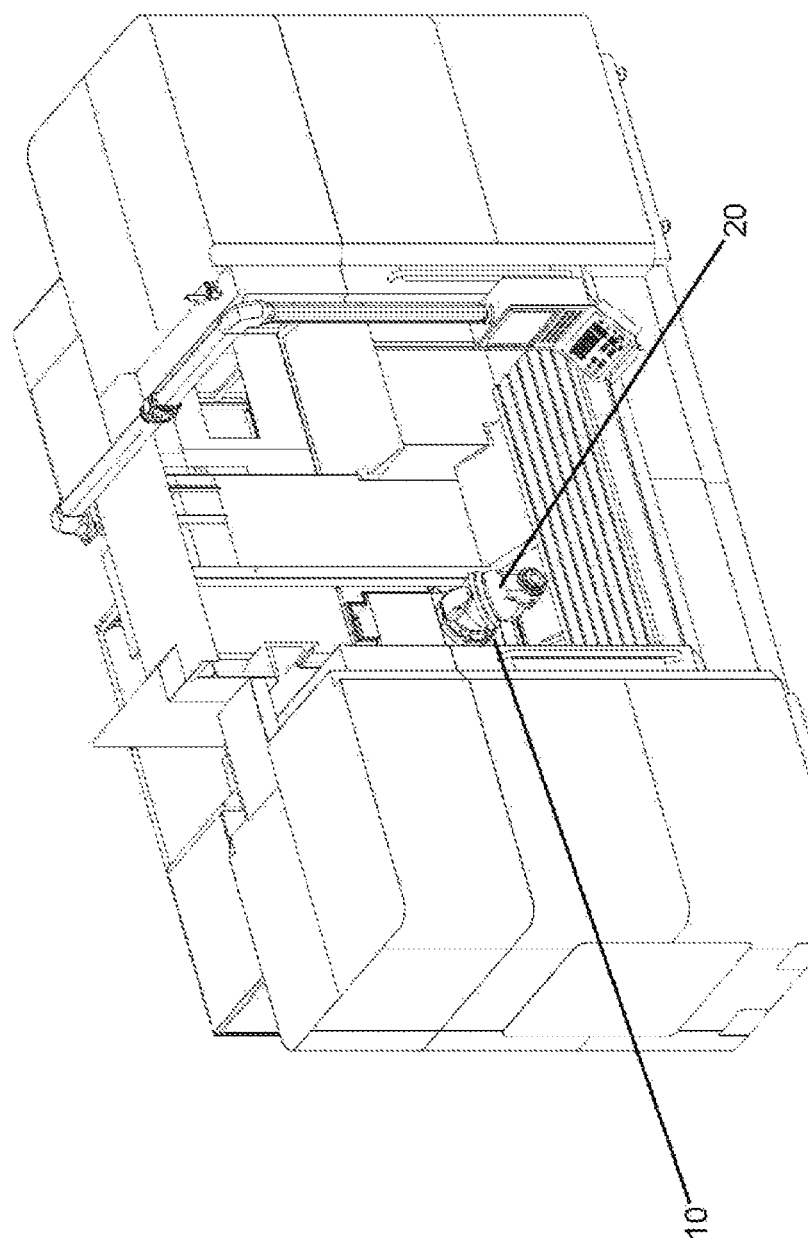
FIG. 1 shows a non-limiting exemplary embodiment of a milling type machine tool according to the invention.

FIG. 1 shows a non-limiting exemplary embodiment of a milling type machine tool according to the invention. The machine comprises a ram (10) which is adapted to project in a cantilevered manner with respect to the machine and which on one free end thereof has a head (20) housing a machine tool.

The ram (10) is an oblong (longer than it is wide) element which, by projecting in a cantilevered manner, and due to the inertia and flexibility thereof, is the part of the machine with the most influence on the dynamic response of the same, such that the behaviour thereof during the machining process can be very different based on the spatial position of the ram (10) with respect to the machine.

Figure 2:
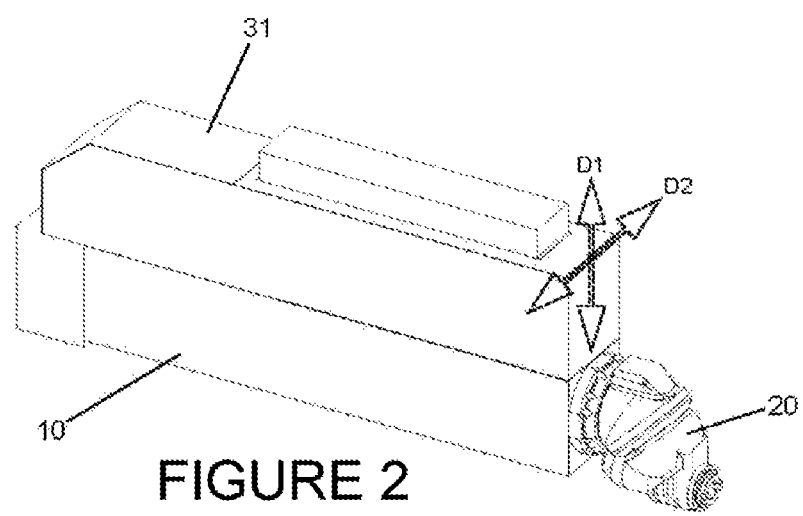
FIG. 2 shows a perspective view of a ram with an upper casing wherein the actuation means of the head and the damping means are incorporated.

Through experiments it has been proven that the critical vibrations of the ram (10) during machining correspond to the bending modes thereof, such that the ram (10) tends to oscillate in mainly two directions (D1, D2) represented in FIG. 2 by dashed arrows. According to the same, in order to dampen the vibrations in the ram (10), it is especially relevant to apply damping forces that are aligned with the main bending directions (D1, D2) in which the ram (10) oscillates.

As can be seen in the figures, the ram (10) has a prismatic shape with a rectangular cross section with four longitudinal walls (11). Arranged on one of said longitudinal walls (11) are actuation means (30) that through proper transmission actuate the head (20) that is located on the free end of the ram (10). Specifically, the actuation means (30) are arranged on the upper longitudinal wall (11) of the ram (10) and are covered by a casing (31).

The assembly of the ram (10) and the housing (31) that incorporates the actuation means (30) is adapted to move vertically with respect to the machine and project horizontally in a cantilevered manner so that the head (20) can carry out the machining operations, which is why it is essential that there is no element that projects from said assembly limiting the path of the ram (10) and that the machining operations are not interfered with.

The longitudinal wall (11) of the ram (10) on which the actuation means (30) are arranged has a partial cross section (12) that is located between the actuation means (30) and the head (20). The invention proposes arranging damping means (41, 42) in the space generated by said partial cross section (12), which allow the vibrations in the two main bending directions (D1, D2) of the ram (10) to be attenuated. This way the damping means (41,42) are located inside the casing (31) of the actuation means (30) without projecting from the ram-casing assembly (10, 31) and in an area as close as possible to the cutting point of the head (20).

Preferably, the damping means (41, 42) are two one-way active dampers, each one of the same being configured to generate a force (F1, F2) in one of the main bending directions (D1, D2) of the ram (10). However, it could be a single two-way active damper that generates the two forces in the two main bending directions (D1, D2) of the ram (10), or even a single damper that generates only one force in one of the main bending directions (D1, D2) of the ram (10) could be used.

One of the one-way active dampers (41) generates a first force (F1) in one of the main bending directions (D1) of the ram (10), the first force (F1) being perpendicular to the upper longitudinal wall (11) of the ram (10), and the other one-way active damper (42) generates a second force (F2) in the other main bending direction (D2) of the ram (10), the second force (F2) being parallel to the upper longitudinal wall (11) of the ram (10) such that the first and second forces (F1, F2) are orthogonal to one another.

Figure 3:
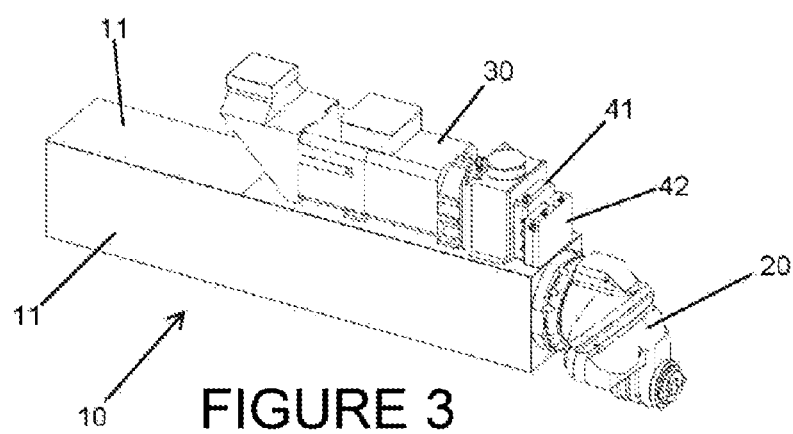
FIG. 3 shows a perspective view of the ram of the preceding figure wherein the casing has been removed so as to show the arrangement of the actuation means and damping means.
Figure 4:
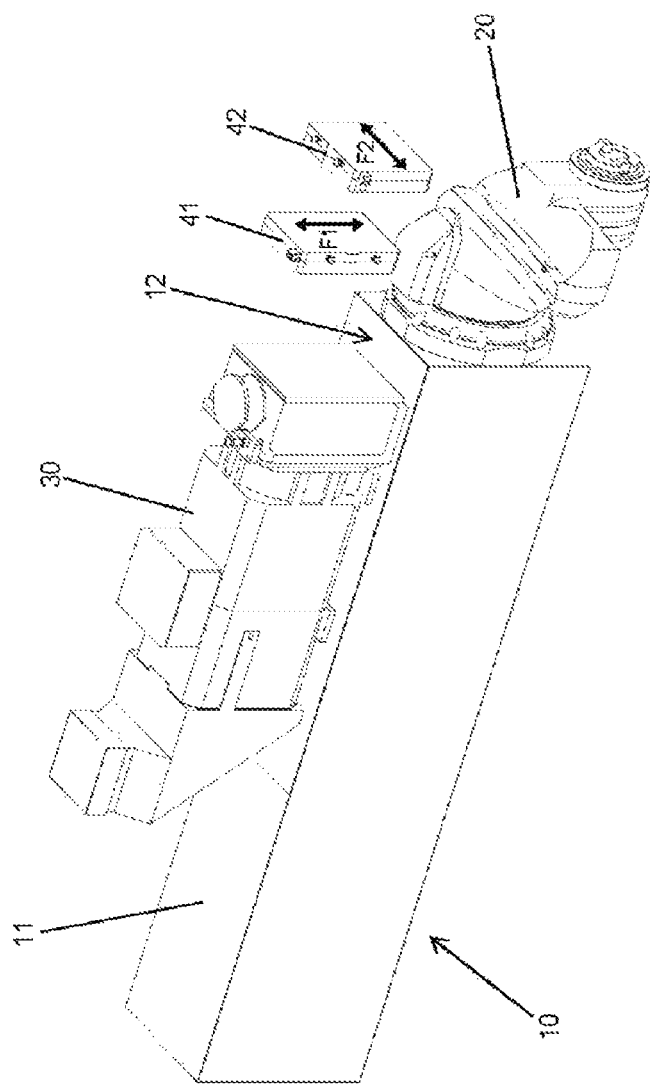
FIG. 4 shows a perspective view like that of the preceding figure but with the damping means in an arrangement in which they are mounted on the partial cross section of the longitudinal wall of the ram.

As shown in FIGS. 3 and 4, the one-way active dampers (41, 42) have a flat rectangular configuration with two large faces and four small faces. The dampers (41, 42) are facing one another and supported by each other by one of the large faces thereof, the forces (F1, F2) they generate being parallel to the large faces thereof and perpendicular with respect to one another, such that the dampers (41, 42) are in a vertical arrangement and overlapping on the large faces thereof, thereby optimising the space occupied in the partial cross section (12) of the longitudinal wall (11) of the ram (10) wherein the actuation (30) means are arranged. Furthermore, the dampers (41,42) act as a combined mass in the oscillation thereof since they are supported by one another by the large faces thereof.

It is envisaged that the two one-way active dampers (41, 42) have an identical configuration such that they are arranged with one being rotated at 90° with respect to the other in order to generate forces (F1, F2) in the main bending directions (D1, D2) of the ram (10).

Preferably the dampers (41, 42) are attached to the actuation means (30) such that the forces (F1, F2) generated by the dampers (41, 42) are transmitted to the ram (10) through the structure of the actuation means (30). Alternatively, the dampers (41, 42) can be directly attached to the upper longitudinal wall (11) of the ram (10). In any case, the attachment of the dampers (41,42) is not a limiting characteristic for the correct operation of the invention, as long as there is a direct or indirect connection that is rigid enough between the dampers (41,42) and the ram (10).

The machine has sensors that measure the magnitude of the vibrations in the ram (10). Specifically, by means of the use of accelerometers co-located in the position where the dampers (41, 42) are situated, a direct measurement of the acceleration at which the ram (10) oscillates in the two main bending directions (D1, D2) is taken. The treatment of said signal allows the set point introduced in the dampers to generate the damping forces (F1, F2) that allow the characteristic regenerative effect of chatter during machining to be suppressed.

The arrangement of dampers (41, 42) on the free end of the ram (10) closest to the machine tool is a highly relevant factor, since the farther away the dampers (41,42) are from the cutting point, the greater the force to be exerted to dampen the vibrations and, therefore, the size of the damper, and the space required to house it, must be greater.

The invention claimed is:

1. A machine tool with active damping, comprising:
   a ram wherein vibrations are produced during the machining according to at least a main bending direction (D1, D2) of the ram, the ram having longitudinal walls,
   a head that is arranged on a free end of the ram,
   actuation means for actuating the head that are arranged on one of the longitudinal walls of the ram, and
   damping means configured to generate at least a force (F1, F2) in the main bending direction (D1, D2) of the ram,
   wherein, the damping means are arranged on a partial cross section of the longitudinal wall of the ram on which the actuation means are arranged, the partial cross section being located between the actuation means and the free end of the ram in which the head is arranged.

2. The machine tool with active damping according to claim 1, wherein the damping means are configured to generate two forces (F1, F2) in two main bending directions (D1, D2) of the ram.

3. The machine tool with active damping according to claim 2, wherein the damping means are two one-way active dampers, each one configured to generate one of the two forces (F1, F2) in one of the two main bending directions (D1, D2) of the ram.

4. The machine tool with active damping according to claim 3, wherein the one-way active dampers have a flat rectangular form with four small faces and two large faces, wherein the dampers are supported and facing one another by the large faces thereof, the forces (F1, F2) generated by the dampers being parallel to the large faces thereof and perpendicular with respect to one another.

5. The machine tool with active damping according to claim 3, wherein the dampers are identical to one another.

6. The machine tool with active damping according to claim 3, wherein the dampers are attached to the actuation means.

* * * * *